United States Patent [19]
Rovnyak

[11] 3,822,398
[45] July 2, 1974

[54] METHOD AND APPARATUS FOR TESTING RESISTIVITY OF REED RELAY CONTACTS

[75] Inventor: Richard Michael Rovnyak, Hanover Park, Ill.

[73] Assignee: GTE Automatic Electric Laboratories Incorporated, Northlake, Ill.

[22] Filed: Nov. 5, 1973

[21] Appl. No.: 412,860

[52] U.S. Cl............................. 324/28 RS, 324/28 CR
[51] Int. Cl................................................. G01r 3/02
[58] Field of Search........... 324/28 RS, 28 R, 28 CR

[56] References Cited
UNITED STATES PATENTS

| | | | |
|---|---|---|---|
| 3,217,243 | 11/1965 | Franklin | 324/28 |
| 3,510,760 | 5/1970 | Hellstrom et al. | 324/28 |
| 3,586,961 | 6/1971 | Rovnyak | 324/28 |

*Primary Examiner*—Alfred E. Smith
*Assistant Examiner*—Rolf Hille
*Attorney, Agent, or Firm*—R. F. Van Epps; J. V. Lapacek

[57] ABSTRACT

Signal generator circuits are connected to a reed switch under test to apply a linearly changing current superimposed on a bias current level simultaneously to an operating coil and to its reed blades. Voltage developed across the contacts is amplified and differentiated while the changing current twists the blades as a result of magnetostriction. When the contacts are made through rough or contaminated areas as they are being moved by the twisting of the blades, the differentiated voltage exceeds a reference voltage and causes an indication of rejection.

10 Claims, 12 Drawing Figures

METHOD AND APPARATUS FOR TESTING RESISTIVITY OF REED RELAY CONTACTS

BACKGROUND OF THE INVENTION

1. Field of the Invention

The present invention relates generally to the field of reed switch testing and in particular to an improved method and apparatus for testing the resistivity of reed relay contacts by differentiating the voltage developed across the contacts as a linearly changing current including a bias current is applied to the reed blades.

2. Description of the Prior Art

Reed switches may be tested during manufacturing by checking the voltage developed across their contacts while a specified current flows through them. Some of these relays passing the manufacturing test fail under operating conditions to demonstrate a required minimum resistance. To determine the reason for these failures, experiments have been conducted to determine orientation of the contacts of the reed blades at different levels of current flow. These experiments show that only small areas of the overlapping surfaces of the reed blades conduct current, and that the reed blades twist slightly in amounts varing directly with the amount of current flow through the contacts and energizing coil such that the location of the conducting areas change with the amount of current.

Test using different fixed levels of current through the reed blades have been proposed for use during manufacturing. When the contacts of a relay are tested at only one or more points where the contacts are relatively smooth and are free of foreign materials, their resistance is below a specified maximum value. However, in service, the contacts may conduct a still different level of current, and/or be held energized at a different level and the resistance at the precise area of contact corresponding to the operating current levels may exceed a maximum allowable value resulting in undesirable operating characteristics.

Testing apparatus has been devised that applies a linearly changing current simultaneously to an operating coil and to its reed blades and then differentiating the voltage developed across the contacts to determine the operating characteristics of the switch. A testing apparatus of this type is described in U.S. Pat. No. 3,586,961 which issued to R. M. Rovnyak on June 22, 1971.

While relay testing apparatus of the prior art provides resistivity data of the contacts, more reliable data simulating operating conditions is desirable.

OBJECTS AND SUMMARY OF THE INVENTION

Accordingly it is a principal object of this invention to provide an apparatus and method for testing the resistivity of reed switch contacts that utilizes a contact current flow which includes a DC bias level and a superimposed linearly changing component. The contact voltage is then processed to yield reliable data simulating operating conditions and amplifying the contact variables of interest.

Another object of the present invention is a method to increase the precision of switch contact measurement of dynamic resistance around the operating point of a reed switch.

DESCRIPTION OF THE PREFERRED EMBODIMENT

Figure 1:
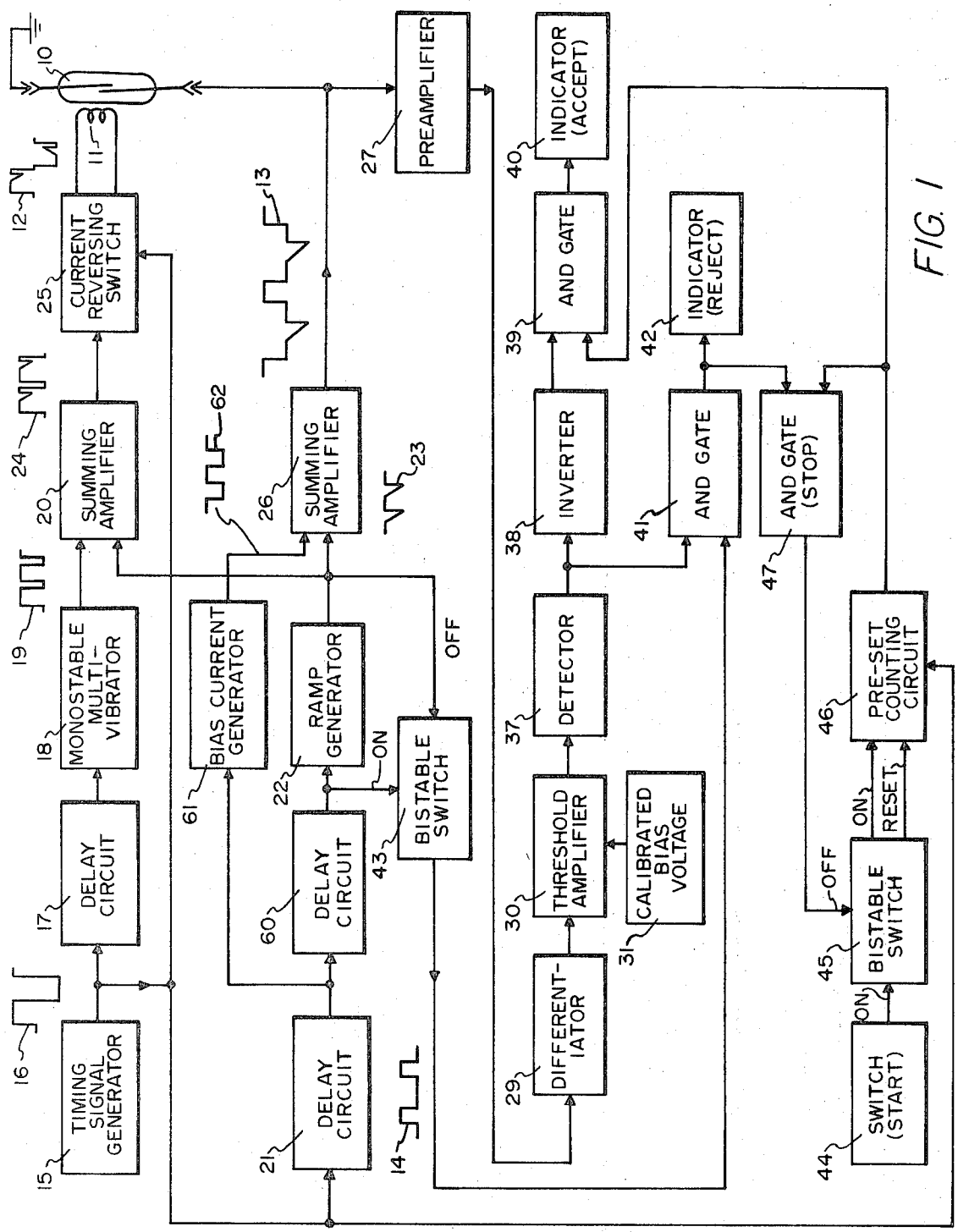
FIG. 1 is a block diagram representation of the apparatus for testing a reed switch according to the method of the present invention.

The block diagram of FIG. 1 illustrates a new combination of circuits suitable for testing reed switches that are represented by the reed switch 10. Equipment according to this circuit supplies current to a test operating coil 11 having a current waveform 12 as shown on FIG. 3D and a current through the contacts of the switch 10 having the waveform 13 as shown in FIG. 3F. Both of these waveforms have ramps of current that decrease simultaneously while a strobing pulse 14 of FIG. 3G enables voltage measurement equipment to test voltage drops across the contacts of a reed switch 10. A switch 10 to be tested is inserted through the coil 11 and its contacts are connected by a Kelvin connection to the test equipment.

Figure 3A:
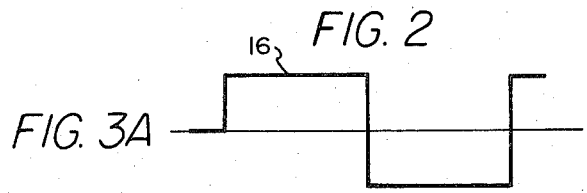
FIGS. 3A through 3J are representations of waveforms of the signals at various points in the apparatus illustrated in FIG. 1.
Figure 3B:
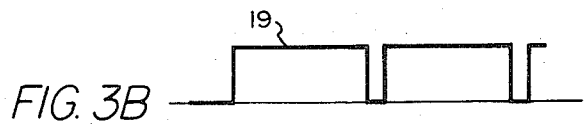

A timing signal generator 15 generates a signal having a square waveform 16 of FIG. 3A, the positive and negative intervals each determining a test. The output of the signal generator is connected through a delay circuit 17 to the input of a monostable multivibrator 18. The multivibrator responds to either a positive or negative change of the timing signal 16 after it is delayed by the circuit 17 to provide succesive positive square wave pulses as indicated by the waveform 19 of FIG. 3B. The output of the multivibrator 18 is connected to the first input of the two inputs of the summing amplifier 20 and determines the initial operating current to be applied to the test coil 11.

Figure 3C:
Figure 3D:
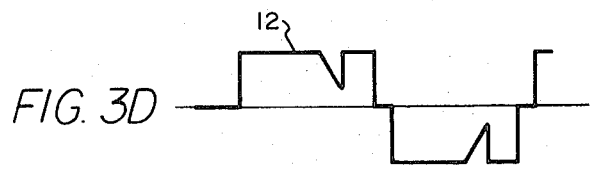

The output of the timing signal generator 15 is also applied through successive delay circuits 21 and 60, each of which has a greater delay time than that of the delay circuit 17, to the input of a ramp generator 22. The output of the ramp generator is zero until the beginning of each timing period that has been delayed by the delay circuits 21 and 60. The output of the generator 22 is then decreased linearly to provide an output according to the waveform 23 of FIG. 3C. This output is applied to the second input of the summing amplifier 20 to be added to the output of the multivibrator 18 for forming at the output of the summing amplifier 20 a signal having a waveform 24. Shortly after the beginning of a timing period corresponding to one half of the period of the waveform 16, current at the output of the summing amplifier 20 rises to a maximum value, for example 60 milliampers, long enough to be certain that a switch having desirable characteristics has operated and its contacts have become sufficiently stationary, for example 40 milliseconds. The current then decreases linearly, for example to 33 milliampers, during the next 10 millisecond interval. The output of the summing amplifier 20 is then applied through a current reversing switch 25 to the test operating coil 11. The current reversing switch 25 has a control input connected to the output of the timing signal generator 15 to operate the switch at the beginning of each interval to provide at the output of the switch reversal of current according to the waveform 12 as shown in FIG. 3D.

Figure 3E:
Figure 3F:
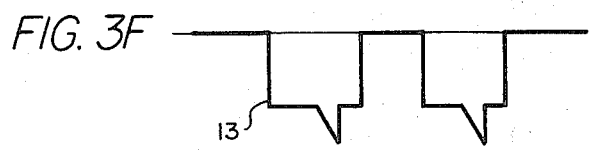
Figure 3G:
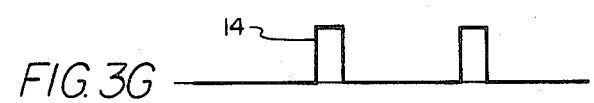

The waveform for the current to be applied to the contacts of the switch under test is also derived from the ramp generator 22 and a bias current generator 61. Bias current generator 61 is driven by the output of delay circuit 21 to provide positive square wave pulses as indicated by the waveform 62 of FIG. 3E. The outputs of the ramp generator 22 and the bias generator 61 are applied to the two inputs of summing amplifier 26. The output of the amplifier 26 shown as waveform 3F is then connected to terminals to be connected to the contacts of the switch 10 that is to be tested. The waveform 3F of the contact current can then be seen to be the superpositioning of the waveform of FIGS. 3C and 3E with a resultant waveform having a bias current level after the beginning of a test cycle and then increasing linearly after approximately one half of the test cycle.

The condition of the switch 10 is determined by observing the change in voltage across its contacts. The voltage across the contacts is low enough to require a Kelvin connection to the terminals of the contacts and careful shielding to prevent noise from stray electrical disturbances. The maximum current represented by the waveform 13 of the amplified ramp current may be 100 milliampers, and typically the resistance across the closed contacts of the switch 10 is approximately 40 milliohms. The contacts of the switch 10 are connected to the shielded input circuit of a preamplifier 27. While current through a pair of contacts under test changes linearly from a bias level as shown in the waveform 13 of FIG. 3F, the waveform 28 of FIG. 3H at the output of the preamplifier 27 has a ramp voltage portion 33 superimposed on a square wave portion with the ramp portion changing linearly as the pair of contacts are moved such that smooth clean areas are always in contact, for example, the portions at the left of the center of the contacts 48 and 49 of FIG. 2. When the current through the operating coil is reversed by the current reversing switch 25, the pair of contacts are twisted in the opposite direction, and when a particle 50 on the contact 48 engages the contact 49, increased resistance across the contacts causes an abnormally large increase in voltage as shown in the portion 35 of the curve 28. The output of the preamplifier 27 is connected to the input of the differentiator 29 to provide at the output of the differentiator a constant voltage 34 as shown in the waveform 51 of FIG. 3I during the interval that the output of the preamplifier 27 is changing linearly.

Figure 3H:
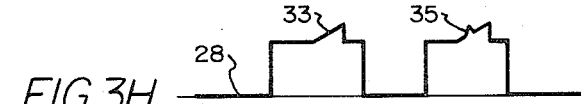
Figure 3I:
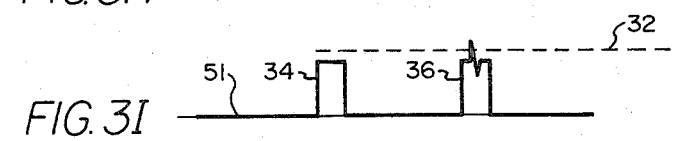

The output of the differentiator 29 is connected to one input of two inputs of a threshold amplifier 30, and a source of calibrated threshold reference voltage 31 is connected to the other input of the amplifier 30. Only differentiated signal having an amplitude greater than the reference voltage produces an output. This threshold reference voltage is indicated by the dashed line 32 in FIG. 3I. While the change in current through the contacts is linear, the change in the voltage across the contacts that are smooth and that have no contaminating particles is linear as shown for the output 33 of the curve 28 of FIG. 3H; therefore the differential voltage 34 of curve 51 shown in FIG. 3I does not exceed the reference voltage 32, and the output of the amplifier 30 is zero. However, when the contacts encounter a point of high resitance while they are being moved relative to each other as a result of changing current flow, the change in voltage across the contacts as a result of the change in resistance is abrupt as shown for the output 35 of the curve 28 such that the differential voltage shown in the output 36 exceeds the reference voltage 32, and voltage appears in the output of the amplifier 30. The operation of differentiating the changing voltage greatly increases the sensitivity of the indicating channels; the rate of change of voltage over the abnormal, peaked portion of the curve 51 of FIG. 3I is greater relative to the normal substantially flat portion than is the departure 35 of the undifferentiated voltage of curve 28 (FIG. 3H) from the normal changing voltage having a constant slope.

The output of the amplifier 30 is connected to the input of a detector 37, and the output of the detector is connected to a circuit for operating an "accept" indicator and also to another circuit for operating a "reject" indicator. The output of the detector is connected to an indicator for showing acceptance through an inverter 38 to one input of an AND gate 39. The other input of the AND gate 39 is connected to a counting circuit described below for applying voltage to the gate during a test period. When the output of the detector 37 is zero, both the counting circuit and the inverter 38 apply voltages to their respective inputs of the AND gate 39. The output of the AND gate 39 is connected to the input of an indicator 40 to operate the indicator only when voltage is absent at the output of the detector 37 during the test period.

The output of the detector 37 is also connected to an input of an AND gate 41 of the circuit for indicating a switch to be rejected. Another input of the AND gate 41 is connected to the output of a bistable switch 43, the bistable switch 43 has an ON input control circuit connected to the output of the delay circuit 21 and an OFF input control circuit connected to the output of the ramp generator 22 so that the output of the switch 43 has the waveform 14 of FIG. 3G. The bistable switch 43 is therefore operated to its on-state during the period that ramp currents are being applied to the test coil 11 and to the contacts of the reed switch 10. When the switch is on, a voltage is applied to the respective input of the AND gate 41, and when the differentiated signal 36 of FIG. 3I exceeds the reference voltage 32, voltage is also applied to that input of the AND gate connected to the output of the detector 37 so that the AND gate conducts voltage to the indicator 42.

The system for testing contacts can be supplied with various starting circuits and counting circuits to provide either manual starting or automatic starting for testing each switch either once or successively a specified number of times. A bistable switch 45 is turned on by operation of a starting switch 44. The switch 45 has two outputs connected to a preset counting circuit 46. The counting circuit starts to count in response to the application of the voltage to one of its input circuits, and after a predetermined number of counts applies voltage to an input of the AND gate 47 and also to an input of the AND gate 39. Another input of the AND gate 47 is connected to the output of the AND gate 41 so that voltage is applied to both inputs of the AND gate 47 at the end of a counting period when the voltage at the output of the detector 37 indicates that a switch under test ought to be rejected. The application of voltage to both inputs of the AND gate 47 causes voltage at the output of the gate to be applied to an OFF-control circuit of the bistable switch 45. In response to the application of the OFF voltage, the bistable switch 45 operates to its RESET state to apply a voltage to the counting circuit 46 to cause it to be reset in preparation for another counting cycle to be started by operation of the starting switch 44.

Figure 2:
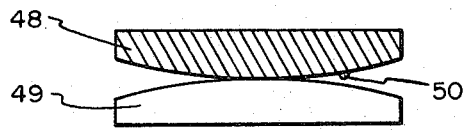
FIG. 2 is an enlarged cross sectional view of the overlapping contacts of a reed switch.

The accepted theory is that the twisting of the reed blades is caused by magnetostriction. A cross section of contacts of mating reed blades 48 and 49 is shown in FIG. 2. The amount of curvature of the contacts of the blades 48 and 49 and the size of a particle 50 near the right edge of the contact of the blade 48 are exaggerated to show the effect of microscopic contours on resistance. The surfaces are assumed to be smooth and free of contaminating particles except for the particle 50.

If the current flow through the blades 48 and 49 and current flow through an operating coil for the blades are in such relative directions that the twist between the blades causes that portion of the contacts between their centers and their left edges to be conductive, the resistance of the contacts is at a desirable minimum value. As long as current flow through the operating winding is sufficient to maintain the contacts closed, the amount by which the blade twist varies directly with the current flow through the blades and tends to vary indirectly with the current flow through the operating winding. As the current through the operating winding is decreased, the twist may increase because the opposition to twisting resulting from the force holding the contacts together decreases more rapidly than the decrease of torque caused by magnetostriction.

A reversal of the current either through the blades 48 and 49 or through the operating winding causes the direction of twisting to reverse such that at certain combinations of amounts of current flow, the particle or projection 50 constitutes the conducting portion of the contact. When these combinations of amount of current are encountered in normal use, the resistance between the contacts 48 and 49 caused by the particle 50 is likely to exceed a specified maximum resistance. The test procedure described above tests the contacts over their entire usable surfaces such that failure in normal use can often be prevented.

Figure 3J:
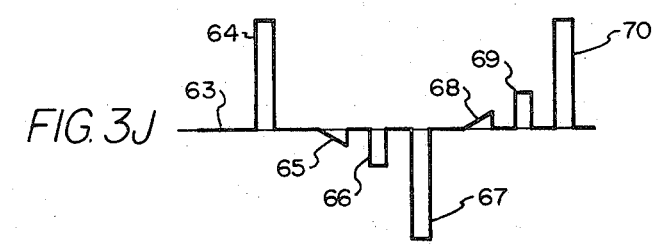

The test method of the present invention may also be modified to test magnetic latching reed switches by generation of an appropriate operating current waveform to be applied to the operating coil 11. Such a waveform 63 as shown in FIG. 3J would include a positive latching pulse 64 of a short duration relative to the operating pulse of FIG. 3D followed in time by a negative ramp portion 65 similar to that in FIG. 3D. Following the ramp portion is an unlatch pulse 66 in the negative direction of the first latching pulse which completes a test cycle. The next test cycle would then include a reversed or negative latching pulse 67 followed by a positive ramp portion 68 and a positive unlatching pulse 69 which completes the second test cycle with a third test cycle again starting with a positive latching pulse 70. The latching pulse is approximately four times the magnitude of an unlatched pulse, with the unlatch pulse being approximately twice the magnitude of the ramp portion. The same contact current waveform 13 of FIG. 3F would be applied to the contacts of the magnetic latching relay under test. To accomplish the testing of magnetic latching reed switches the monostable multivibrator stage 18 would be modified to produce two pulse outputs representing the latch and unlatch pulses with the ramp portion again being added to the current waveform by the ramp generator 22 by means of summing amplifier 20 to produce the waveform of FIG. 3J.

The apparatus and method of the present invention utilizes the combination of a bias current and a superimposed ramp current portion applied to the contacts of a reed switch under test with the resultant contact voltage being differentiated which is compared to a reference voltage to determine the quality of the contacts. The results obtained with the present method cannot be duplicated either by a method utilizing only a bias current or by a method utilizing only a ramp contact current due to various parameters of the blade contact resistance and inherent parameters of the blade materials. Further the present method provides a more reliable indication of the operating characteristics of the reed switch with a resultant optimization of acceptance rate of reed switches in the manufacturing test group. A testing method utilizing only a ramp portion of contact current in which the ramp portion traverses the entire current range from zero current to maximum operating current may reject switches whose contacts are perfectly acceptable and satisfactory for normal operating conditions.

The use of a bias current with a superimposed ramp portion for contact testing results in shortened test time, simplification of equipment and increased resolution of measurement than could be obtained with either a constant bias current test or a ramp portion test covering the same current range as the present invention. The resolution of measurement in reed switch testing can be improved by the utilization of a bias current since the blade or pin resistance to a great degree is removed from the test results. It should be realized that the measured contact resistance includes the two components of blade resistance and constriction distance. The constriction resistance is that component attributed directly to the contact surface of the blades and varies with the contact force. Also the blade or pin resistance in most cases is 5 to 20 times greater than the constriction resistance and therefore the elimination of the blade resistance from the test result is of great importance in amplifying the variable of interest which is the constriction resistance. With a large bias current relative to the magnitude of the ramp portion which approximates normal operating conditions, the greater portion of the blade resistance is eliminated from the test results since the blade resistance is a constant and the differentiated product of constant bias current and constant blade resistance is zero such that it does not appear in the test result. The only portion of the blade resistance appearing in the test result would be that component due to the magnitude of the ramp current which is a small portion of the bias current in most cases.

In any testing method where small voltages and currents are involved, the integrity and stability of connections to the contact terminals to be tested is of great importance. A large magnitude ramp current of peak magnitude equal to the combined bias current and ramp portion of the present invention may cause undesirable effects at the test connections and further introduce noise into the measurements. In some cases it may be desirable to impose a steady state bias current simply to stabilize the external connections particularly if their is an oxide or film on the connections due to their method of fabrication or accumulation.

Further thermal effects on contact resistance normally vary over a wide range of current and may result in poor resolution of the desired test information especially after being enhanced by differentiation as used in testing reed switches. The undesirable thermal effects due to the temperature coefficient of resistivity of the constriction resistance and blade resistance is minimized by the use of a large magnitude bias current in relation to the magnitude of the ramp portion since the constant effects of thermal instabilities will be differentiated out by the present test method and will also simulate normal operating conditions. A large variation of current utilized in a "ramp portion only" test may also cause plastic deformation and abrupt changes in the contact resistance due to heat generation at the blade contact area. These thermal instabilities may be of very little concern if normal operating conditions are a steady state bias current with a small signal level.

The test time per reed switch can also be reduced by use of a bias current as opposed to a ramp portion only testing method since the ramp only method must have a slope to its ramp portion no higher than the ramp portion superimposed on the bias current since any higher slope would tend to mask or cover up changes in resistances and cause thermal and noise contact instabilities and other acceleration effects. Therefore a ramp only test with the same slope as the ramp portion utilized in combination with a bias current necessarily increases the length of time of a test period.

The method and apparatus for testing resistivity of reed relay contacts of the present invention by the utilization of a steady state bias current with a superimposed ramp portion increases the reliability of test data by closely approximating normal operating conditions and reducing the effects of various instability phenomena while also reducing the test time as opposed to other testing methods.

Whereas the preferred form of the invention has been shown and described herein, it should be realized that there maybe many modifications, substitutions and alterations thereto without departing from the teachings of this invention.

Having described what is new and novel and desired to secure by letters patent, what is claimed is:

1. The method of testing reed switch contacts, comprising the steps of;
    providing an ample flow of operating current through the operating winding of a reed switch under test for at least a first period sufficiently long to close its contacts;
    applying a flow of current through said contacts during a second period following said first period, the flow of current through said contacts including a DC bias level component and a superimposed gradually changing component, the point through which current is conducted through the mating surfaces of said contacts being moved over said surfaces as a result of a slight twisting of the reeds caused by said changing flow of currents; and
    detecting across said contacts voltage that is abnormally high at any instant during said second period during which the flow of current is being changed through said contacts.

2. The method of testing reed switch contacts according to claim 1 wherein the detection of said abnormally high votage across said high contacts is determined by differentiating said voltage developed across said contacts, said differentiated voltage being detected when above a maximum acceptable constant level.

3. The method of testing reed switch contacts according to claim 2 wherein said operating current changes from an initial ample flow to a minimum amount of flow still sufficient to maintain said contacts closed while said current flowing through said contacts during said second period is being decreased.

4. The method of testing reed switch contacts according to claim 3 wherein said test is repeated while applying said operating current in a reversed direction.

5. The method of testing reed switch contacts according to claim 1 including the further step of providing a flow of current through the operating winding of a magnetic latching reed switch under test to unlatch said switch during a third period of time following said second period, the polarity of said unlatched flow of current being opposite to said flow of current in said first period.

6. The method of testing reed switch contacts according to claim 5 wherein said unlatch flow of current is applied in the opposite polarity when said test is repeated.

7. A test circuit for testing reed switches, comprising:

a timing signal generator for marking successive timing periods;
    a current generator having delay means connected to said timing signal generator and current generator means connected to said delay means responsive to signals from said timing signal generator for developing a maximum level of current starting a predetermined time after the start of each of said timing periods;
    additional delay means connected to said timing signal generator and a ramp current forming means connected to said additional delay means and to said current generating means, said ramp current forming means being effective a predetermined interval after the start of said maximum level of current to decrease linearly the output of said current generating means to a minimum level of current before the end of each of said timing periods;
    means connecting a test coil for reed switches under test to the output of said current generator;
    contact current generator means having a pair of test terminals adapted to receive the reed terminals of a reed switch under test for providing current through the contacts of the reed switch, said contact current including a DC bias level and a superimposed gradually changing component; and
    voltage measuring means connected across said pair of test terminals for determining any peaks of voltage above a predetermined maximum value across said pair of test terminals while the output of said current generator is being decreased linearly.

8. A test circuit as recited in claim 7 wherein said voltage measuring means includes an amplifier, a differentiator and detecting means connected to said test terminal, said detecting means being biased to provide an output only when the voltage across said pair of test terminals exceeds said predetermined maximum value.

9. A test circuit as recited in claim 7 wherein said means for connecting said test coil includes a current reversing switch.

10. The method of testing a set of contacts, comprising the steps of;

applying a DC bias flow of current through said contacts;

superimposing a gradually changing flow of current on said DC bias flow of current through said contacts after a predetermined time delay measured from the initial flow of DC bias current, said changing flow of current being of smaller magnitude relative to said DC bias component of current, the point through which current is conducted through the mating surfaces of said contacts being moved over said surfaces as a result of a slight twisting of the contacts caused by said changing flow of current; and detecting across said contacts voltage that is abnormally high at any instant during which the flow of current is being changed, said detection being determined by differentiating said voltage developed across said contacts, said differentiated voltage being detected when above a maximum acceptable constant level.

* * * * *